Figure 3:
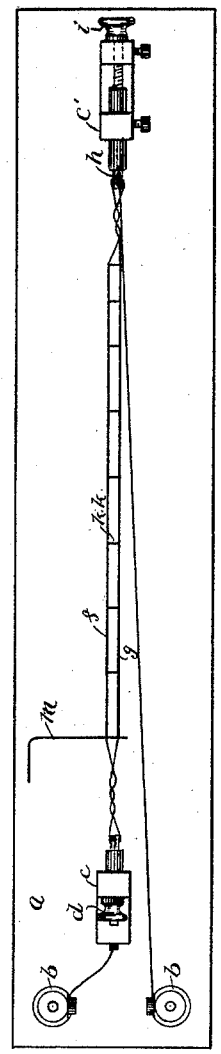

(No Model.)

E. R. CARICHOFF.
VOLTMETER.

No. 485,826. Patented Nov. 8, 1892.

WITNESSES:
Bessie C. Jones.
Edwin Smith

INVENTOR:
Eugene R. Carichoff
by Chas. H. Drew
his attorney.

UNITED STATES PATENT OFFICE.

EUGENE R. CARICHOFF, OF RICHMOND, KENTUCKY.

VOLTMETER.

SPECIFICATION forming part of Letters Patent No. 485,826, dated November 8, 1892.

Application filed May 12, 1890. Serial No. 351,371. (No model.)

*To all whom it may concern:*

Be it known that I, EUGENE R. CARICHOFF, a citizen of the United States, residing at Richmond, in the county of Madison and State of Kentucky, have invented certain new and useful Improvements in Voltmeters; and I do hereby declare that the following is a full, clear, and exact description of the invention, which will enable others skilled in the art to which it appertains to make and use the same.

The object of my invention is an improved voltmeter. I accomplish my invention by making use of the heating and not the magnetic action of an electric current, so that the elevation of the temperature of the conductor is measured by its expansion.

To accomplish my invention I make use of two high-resistance wires, which may be elastic or not without varying the principle of my invention. These wires are to be stretched side by side, or substantially parallel, a short distance apart and united at intervals. A twist is given to these wires, as shown in the drawings, when they are cold. When tension is applied at the ends by expansion or other cause, the wires unwind and the pointer is rotated.

Figure 2:
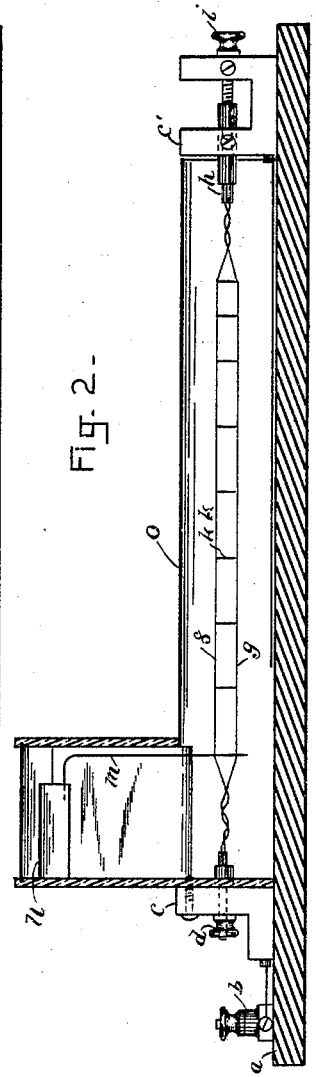
Figure 1:
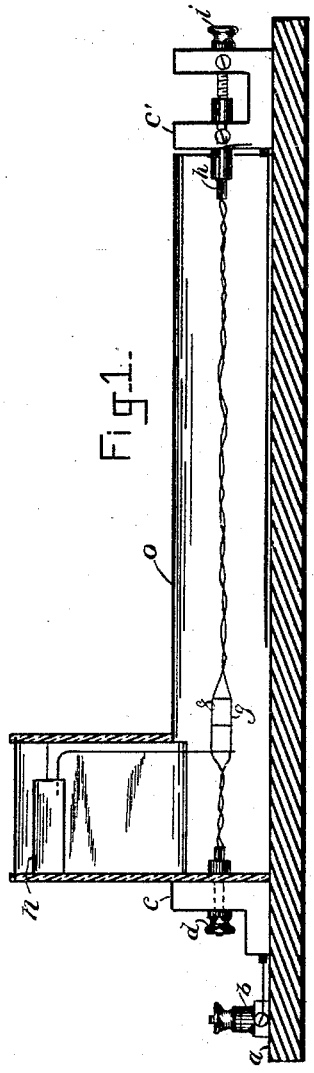

In the drawings, in Figure 1 I have shown a longitudinal section of the first form of my invention, in Fig. 2 a longitudinal section of the second form of my invention, and in Fig. 3 a plan view of the same.

$a$ is the stand, made of some suitable non-conducting substance, with which the parts above described are to be connected.

$b\ b$ are the terminals.

$c\ c'$ are standards. Through the standard $c$ passes the screw $d$, to which is attached the wires $f$ and $g$ at one end. The other ends of these wires are attached to the rod $h$ in the standard $c'$. This rod may be moved forward or back by means of the screw $i$, so as to impart a tension to the wires $f$ and $g$ or slacken them, as may be desired. By means of the screw $d$ a twist is given to the wires. The wires $f$ and $g$ are connected with each other by means of the short transverse pieces of wire or glass or equivalent material $k\ k$.

$m$ is a pointer made preferably of glass.

$n$ is a scale properly graduated.

$o$ is a tube or covering, preferably of brass, for the purpose of preventing the wire from being influenced by the changes of temperature or currents of the atmosphere.

The wires $f\ g$ are made of either elastic or non-elastic metal. They should possess high resistance and be made very fine. A diameter as small as .0025 of an inch would ordinarily be the size adopted.

I should commonly use platinum, platinum-silver, or platinoid; but this is not an essential part of my invention. When a current of electricity is sent through the wires, the increase in length by means of the twist given to the wires, as above stated, actuates the pointer $m$.

Among other advantages obtained by the use of my invention are the following: Alternating potential differences may be correctly measured. There is no heating error. My instrument is portable, being much smaller than any voltmeter having the same range now in use, so far as I know. It is not disturbed by magnets, may be direct-reading, and is dead-beat. It may be employed for measuring small potential differences, and there is no vagueness or inaccuracy in the readings, either near the zero-point or the upper parts of the scale.

In order to measure high voltages, I put resistance into the line and connect my instrument therewith. High alternating currents may be measured by attaching the instrument to the secondary of a transformer. By this manner but little energy is consumed.

What I claim, and desire to secure by Letters Patent, is—

1. In a voltmeter, the combination of two wires stretched substantially parallel with each other and retained in their separated positions by any appropriate means, said wires having a twist imparted to them, a suitable pointer connected transversely with said wires, and a scale, all as and for the purpose set forth.

2. In a voltmeter, two high-resistance wires stretched side by side and connected at intervals by cross-pieces, said wires having a twist imparted to them, in combination with a suitable pointer connected transversely with said wires, and a scale, all as and for the purpose set forth.

3. In combination, the two standards $c\ c'$, the screw $d$, extending through the standard $c$, the rod $h$, extending from the standard $c'$, the screw $i$, extending through a standard and secured to the rod $h$, the wires $f$ and $g$, connected by cross-pieces and connecting the screw $d$ and rod $h$, and a pointer transversely connected with said wires, all as and for the purpose set forth.

EUGENE R. CARICHOFF.

Witnesses:
ANTON M. LYMAN,
CHAS. H. DREW.